(12) United States Patent
Hii et al.

(10) Patent No.: US 8,059,170 B2
(45) Date of Patent: Nov. 15, 2011

(54) METHOD AND SYSTEM FOR PROCESSING A VIDEO INSTANT MESSAGE

(75) Inventors: Toh Onn Desmond Hii, Singapore (SG); Willie Png, Singapore (SG)

(73) Assignee: Creative Technology Ltd., Singapore (SG)

( * ) Notice: Subject to any disclaimer, the term of this patent is extended or adjusted under 35 U.S.C. 154(b) by 1172 days.

(21) Appl. No.: 11/512,063

(22) Filed: Aug. 28, 2006

(65) Prior Publication Data

US 2008/0049107 A1    Feb. 28, 2008

(51) Int. Cl.
*H04N 5/262* (2006.01)
(52) U.S. Cl. ........................................ 348/239
(58) Field of Classification Search .................. 348/239, 348/222.1
See application file for complete search history.

(56) References Cited

U.S. PATENT DOCUMENTS

| 5,914,748 | A | * | 6/1999 | Parulski et al. | 348/239 |
| 6,020,916 | A | | 2/2000 | Gerszberg et al. | |
| 6,441,850 | B1 | * | 8/2002 | Dotsubo et al. | 348/239 |
| 6,633,332 | B1 | * | 10/2003 | Nay et al. | 348/220.1 |
| 6,690,416 | B1 | * | 2/2004 | Silverbrook | 348/207.2 |
| 2004/0260669 | A1 | | 12/2004 | Fernandez | |

* cited by examiner

*Primary Examiner* — Tuan Ho

(57) ABSTRACT

There is provided a method and system for processing a video instant message. The method and system may include receiving at least one image; generating the at least one image into a composite image; and communicating the composite image to a receiver as the instant message. Preferably, the at least one image from the sender may be obtained from, for example, a screen capture of a display at the sender, or an image capture device at the sender. It may be advantageous to generate a graphical user interface for a video instant messaging application to allow either the sender or receiver to select the at least one image making up the composite image. The graphical user interface may be either online or locally installed.

17 Claims, 6 Drawing Sheets

METHOD AND SYSTEM FOR PROCESSING A VIDEO INSTANT MESSAGE

FIELD OF INVENTION

The present invention relates generally to the field of processing a video instant message to include a composite image.

BACKGROUND

The increasing popularity of broadband internet access globally has led to an exponential increase in the adoption of communication methods like video instant messaging and video conferencing. The large variety and easy availability of free communication software from companies like Microsoft, Yahoo, Skype, and America Online which enable video instant messaging and video conferencing also aid in increasing the popularity of such communication methods.

However, the aforementioned software cater primarily for recreational use and does not facilitate convenient desktop sharing. For example, there may be instances during video instant messaging where there may be a need to refer to a point(s) on a graph, and describing the exact point requires identification of coordinates of the point(s) which may not be convenient. Showing a print-out of the graph with the use of an image capture device may suffice, but that depends on the image capture device being able to capture the print-out of the graph in sufficient detail for a receiver to make out what a sender is describing. Thus, high resolution for both the print-out and the image capture device is required to enable video instant messaging to work in the desired manner. Unfortunately, transmission of high resolution images requires the use of greater bandwidth which may not be readily available. Instant file transfer may not be adequate for such instances where data being discussed may be constantly changing.

In addition, video instant messaging usually involves the image capture device capturing an entire area in front of the image capture device. This may be undesirable as the sender may wish to hide/block/obscure certain parts of the area captured by the image capture device or the receiver may wish to view only certain portions of the area captured by the image capture device. That is not possible at the moment with the communication software currently available.

SUMMARY

There is provided a method for processing a video instant message. The method includes receiving at least one image; generating the at least one image into a composite image; and communicating the composite image to a receiver as the instant message. Preferably, the at least one image from the sender may be obtained from, for example, a screen capture of a display at the sender, or an image capture device at the sender. It may be advantageous to generate a graphical user interface for a video instant messaging application to allow either the sender or receiver to select the at least one image making up the composite image. The graphical user interface may be either online or locally installed.

It is preferable that the image capture device captures both still images and a stream of images. It is also preferable that the method is performed in an imaging device driver to interface the image capture device to a video instant messaging application associated with the device driver. The imaging device driver may be configured to communicate with a video instant messaging application such as, for example, AOL Instant Messenger (AIM), MSN Instant Messenger, Skype Messenger, or Yahoo Instant Messenger.

The composite image may be composed by either the sender or the receiver. The screen capture may be either a partial screen or full screen capture. The image obtained from the image capture device may be either at least one portion of the image or an entire image.

There is also disclosed an image processing system to process a video instant message. The system includes an interface module to receive at least one image from an image source; and a processing module to generate the at least one image into a composite image, the composite image being for communication to a receiver as the video instant message. It is preferable that the at least one image is obtained using the interface module from either a screen capture of a display, or an image capture device.

Preferably, the image capture device captures both still images and a stream of images. The processing module may preferably generate a graphical user interface to allow selection of the at least one image making up the composite image. The graphical user interface may be either online or locally installed. The interface module may preferably be provided to interface an image source to the processing module.

It is advantageous that the composite image is arranged by either a sender or the receiver. The processing module may include a video instant messaging application such as, for example, AOL Instant Messenger (AIM), MSN Instant Messenger, Skype Messenger, or Yahoo Instant Messenger. The screen capture may be of a partial screen or a full screen. The image obtained from the image source may be either at least one portion of the image or an entire image.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

The following discussion is intended to provide a brief, general description of a suitable computing environment in which the present invention may be implemented. The invention will be described in the general context of computer-executable instructions, such as program modules, being executed by a personal computer. Generally, program modules include routines, programs, characters, components, data structures, that perform particular tasks or implement particular abstract data types. As those skilled in the art will appreciate, the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
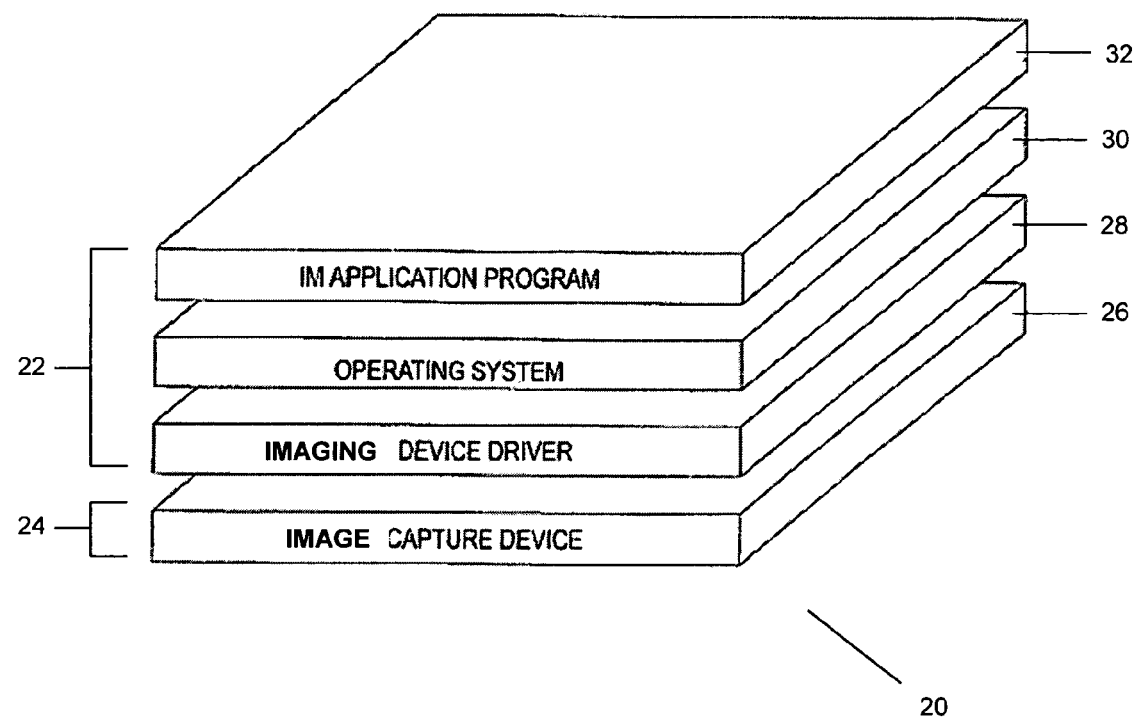
FIG. 1 shows a schematic block diagram of exemplary hardware and software layers in a computer system, in accordance with a preferred embodiment of the invention.

Referring to FIG. 1, there is shown a computer system 20 including a hardware layer 24 and a software layer 22. The hardware layer 24 may be an image capture device 26 but it may be possible for several other hardware devices such as, for example, a printer, audio card, graphics card, CD reader/writer, DVD reader/writer or the like to be provided. The software layers 22 as shown include an IM application program 32, an operating system 30, and an imaging device driver 28. The imaging device driver 28 may include optical character recognition (OCR) functionality.

The IM application program 32 may be any one of a plurality of different IM application programs such as, for example, Yahoo Instant Messenger, MSN Instant Messenger, Skype Messenger, AOL Instant Messenger, and the like. The operating system 30 may be, for example, a Microsoft Windows-based operating system, a Unix system, Linux, or any other operating system. In one exemplary embodiment, the system 20 may communicate both video and text instant messages via the Internet.

The image capture device 24 may be a web camera, scanner or any other visual capture device. It should be noted that the software layer 22 and hardware layer 24 of the system 20 are merely demonstrative and, in different embodiments, one or more components of the software layer 22 may be omitted, combined or rearranged. Further software layers 22 may also be included. Similarly, multiple hardware device drivers may also be required depending on the hardware in the hardware layer 24.

The imaging device driver 28 may be a proprietary device driver written by a manufacturer of the image capture device 24. However, there may be compatible image capture devices 24 not made by the same manufacturer which is able to use the imaging device driver 28. The imaging device driver 28 may act as a conduit and translator between the IM application program 32 and the image capture device 24.

Figure 2:
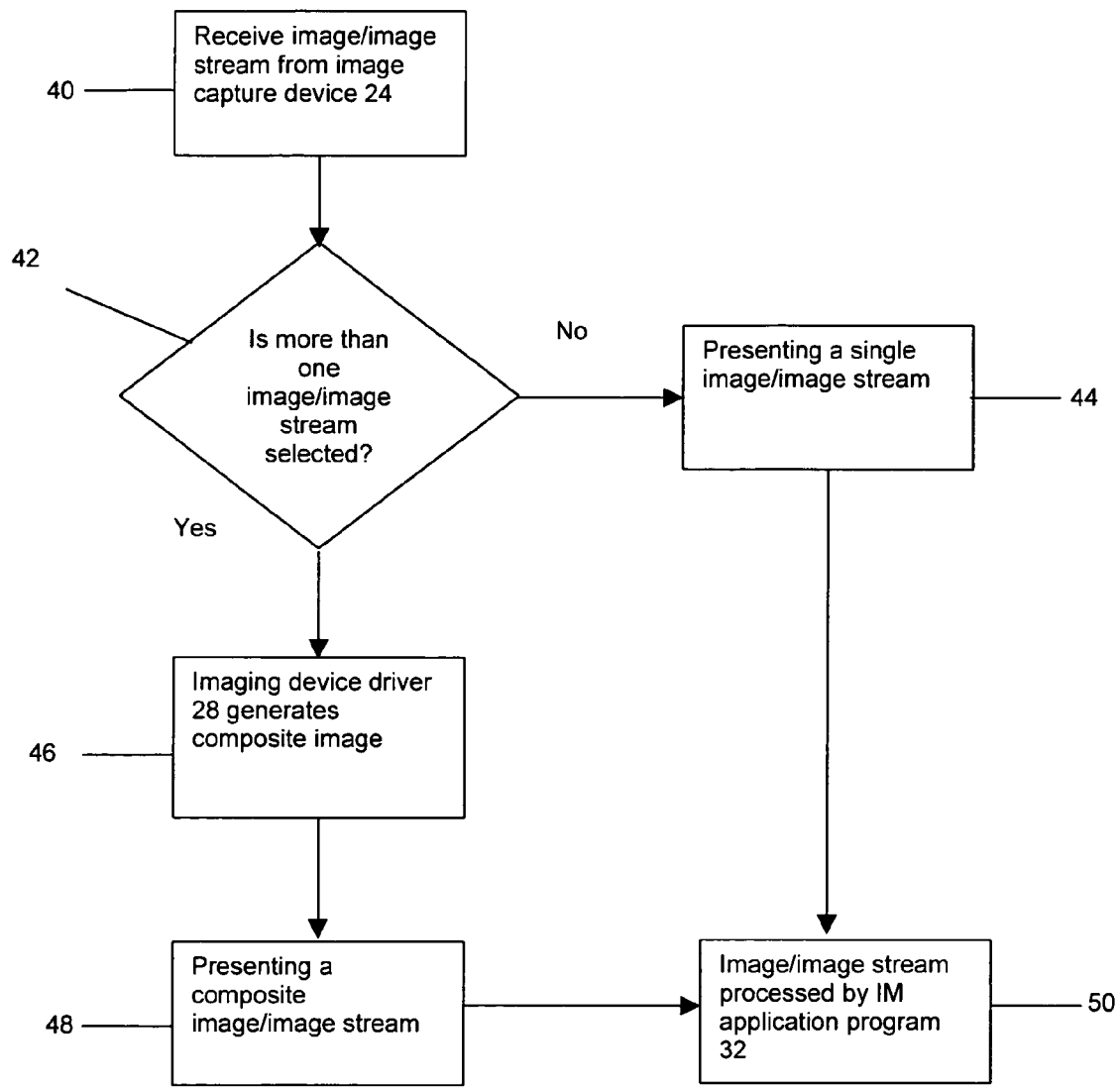
FIG. 2 shows a schematic flow diagram of a preferred embodiment of the method of the present invention.

Referring to FIG. 2, there is shown a schematic flow diagram of a preferred embodiment of a method for processing a video instant message. The method may include receiving at least one image from an image capture device 24 (40). The at least one image may be a still image or a stream of images. A user may utilise a representative graphical user interface (GUI) 90 as denoted in FIG. 3 to utilise the imaging device driver 28. The GUI 90 may be web-based and need not be installed locally in a particular computer. The user may be either a sender or receiver. A more detailed description of the GUI 90 will be provided at a subsequent portion of the description.

Figure 3:
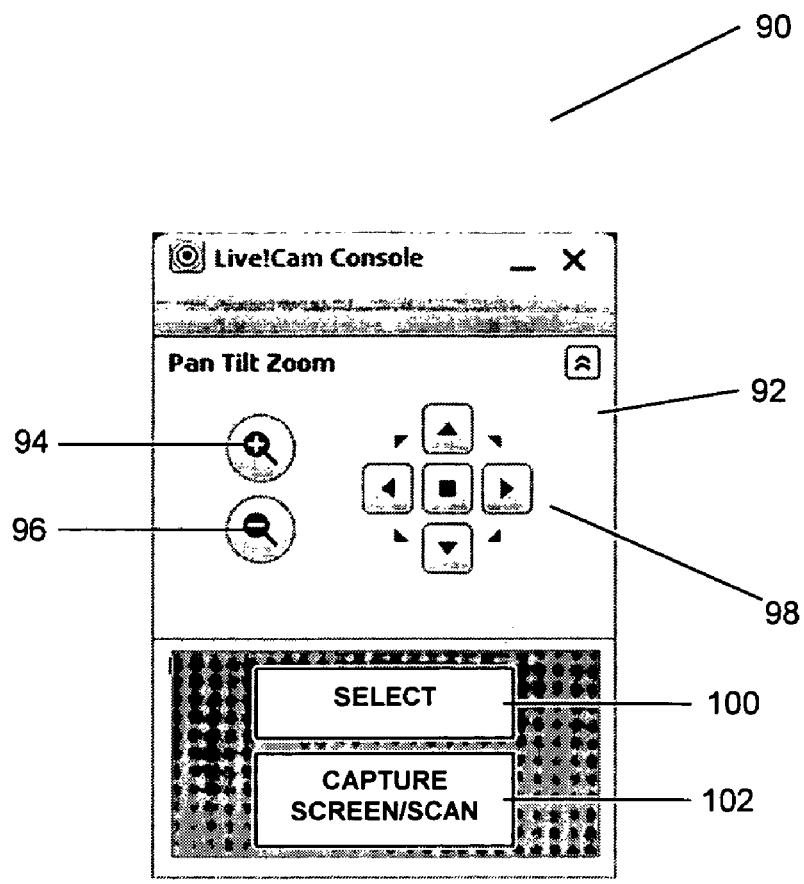
FIG. 3 shows a representative graphical user interface, in accordance with the invention, generated by an instant messaging (IM) application using the video device driver.

With the use of the GUI 90 denoted in FIG. 3, the user may select more than one image to be transmitted using the IM application program 32 (42). If only one image is selected, then a single image (or stream of images) is presented (44), just like any webcam in the current state of the art. The single image/image stream is subsequently processed by the IM application program 32 (50) and transmitted to the receiver.

Figure 4A:
FIG. 4A shows an image captured by an image capturing device.
Figure 4B:
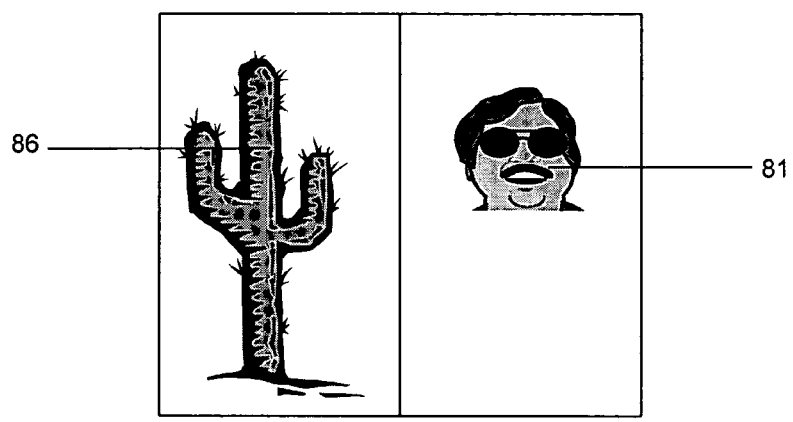
FIG. 4B shows a composite image, in accordance with the invention, sent via a computer network to a receiver.

However, if more than one image is selected by the user, a composite image for the more than one image is generated by the imaging device driver 28 (46). The makeup of the composite image may be arranged by the user or automatically (in accordance with default settings) by the imaging device driver 28. Referring to FIG. 4A, there is shown an example of an image 80 captured by the image capture device 24. The image 80 shows a male golfer 82, a car 84, and a cactus 86. The image 80 may be a still image or a stream of images. The user may use the imaging device driver 28 in conjunction with the GUI 90 as shown in FIG. 3. The user may use a "Pan Tilt Zoom" control 92 on the GUI 90 to select portions of the image 80 that may be of primary interest to the user. Each selected portion of the image 80 may be considered to be a single image or a single image stream. The "Pan Tilt Zoom" control 92 may have a zoom-in button 94 and a zoom-out button 96. Directional buttons 98 allow for objects in the image 80 to be centred. The directional buttons 98 may be to either physically control movement of the image capture device 24 or to control movement of the image 80 captured by the image capture device 24. For example, the user may only wish to see the cactus 86 and a face 81 of the male golfer 82. The user then uses the GUI 90 to zoom into the cactus 86 before pressing the "select" button 100. Subsequently, the user zooms into the face 81 of the male golfer 82 before also pressing the "select" button 100. Correspondingly, a composite image shown in FIG. 4B is generated. The selection of portions of the image 80 allows for the selected portions to be observed in greater zoomed-in detail. The side-by-side layout of the composite image shown in FIG. 4B may be a default arrangement set by a manufacturer of the imaging device driver 28, or determined by the user.

Referring back to FIG. 2, after the composite image is formed by the imaging device driver 28, the composite image/image stream is correspondingly presented (48). The composite image/image stream is subsequently processed by the IM application program 32 (50) and transmitted to the receiver. Communication to the receiver may be via a network.

If the IM application program 32 allows for the incorporation of plug-ins, the facility of image composition in the aforementioned method may be performed by the IM application program 32 and not the device driver 28.

Figure 5A:
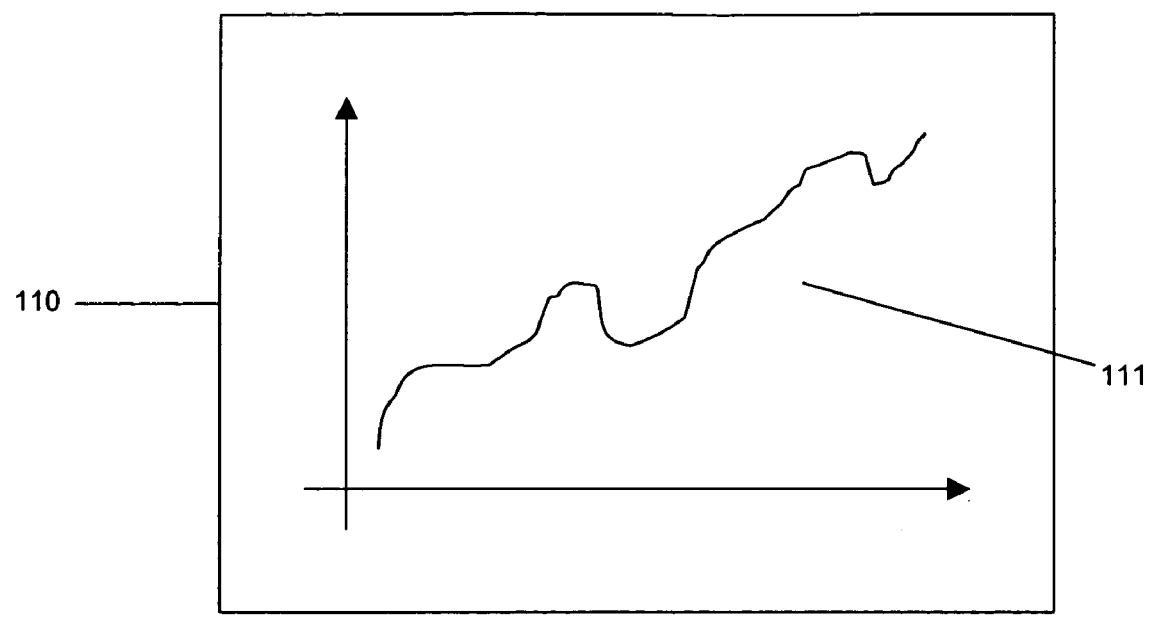
FIG. 5A shows contents on a display of a sender.
Figure 5B:
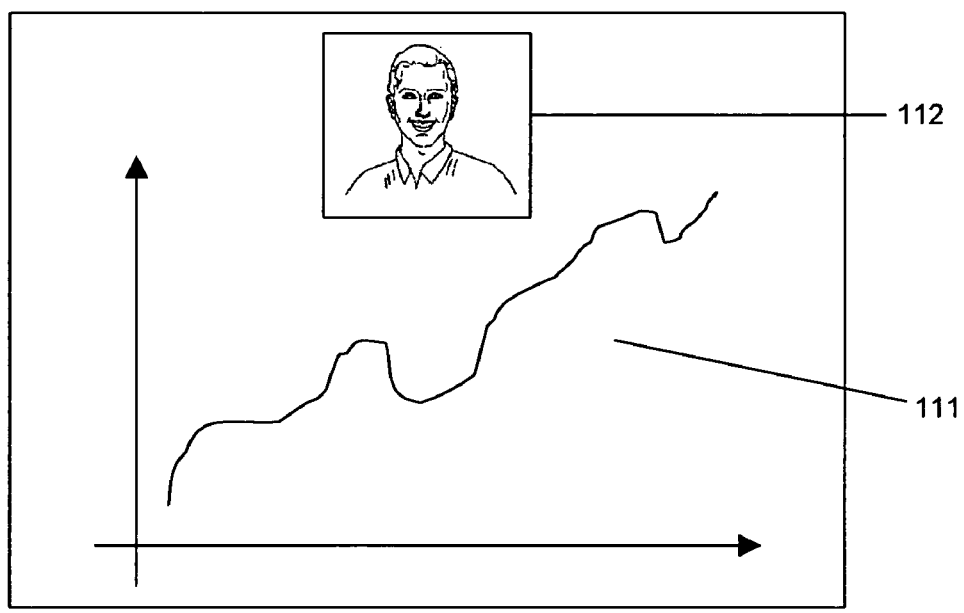
FIG. 5B shows an alternative composite image, in accordance with the invention, sent via a computer network to the receiver.

Alternatively, besides multiple images (forming the composite image) actually being different portions of a single image as described earlier, another type of composite image is shown in FIG. 5B. FIG. 5A shows contents on a display 110 of the sender. The display 110 may be a screen, such as, for example, Microsoft Windows Desktop, Mac Tiger Desktop and the like. In this instance, the display 110 shows a graph 111. The aforementioned method for processing a video instant message may also include composite images with a screen capture of content directly from the display 110 of the sender combined with an image or stream of images obtained by an image capture device 24. This is shown in the composite image of FIG. 5B, where the graph 111 from the display 110, and the image or stream of images obtained by an image capture device 24 in a sub-box 112 is presented. While the graph 111 is shown in FIG. 5A, it should be noted that the content obtained from the display 110 may be anything shown on the display 110, such as, for example, documents, spreadsheets, pictures, presentations, and so forth. Changes to the content on the display 110 may be transmitted at real-time to the receiver. Thus, the receiver may also be able to see the movement of a pointer controlled by the sender and all other input by the sender. This aids in the receiver's understanding of ongoing communication.

Referring back to FIG. 3, the content from the display 110 (either whole or partial) may be captured by selecting the "capture screen/scan" button 102 from the GUI 90. Partial capture of the content from the display 110 may be effected using the zoom in button 94 and the zoom out button 96, combined with use of the directional buttons 98. A component of the composite image may also be obtained directly from a scanner, also by selecting the "capture screen/scan" button 102 from the GUI 90. This scan capture feature may be enabled by the presence of OCR functionality in the imaging device driver 28 and may aid in sharing a particular printed medium between a sender and receiver. An additional step of scanning and saving a scanned image as an image file is eliminated. The GUI 90 may also be able to select specific "windows" or application programs on the display 110. The sender may select a window which is an Internet browser such that the contents in the browser are selected for transmission in an IM. Multiple "windows" may be selected, with a composite image transmitted in an IM to the receiver. As mentioned earlier, either the sender or the receiver may determine the make-up of the composite images being sent and received.

Figure 7:
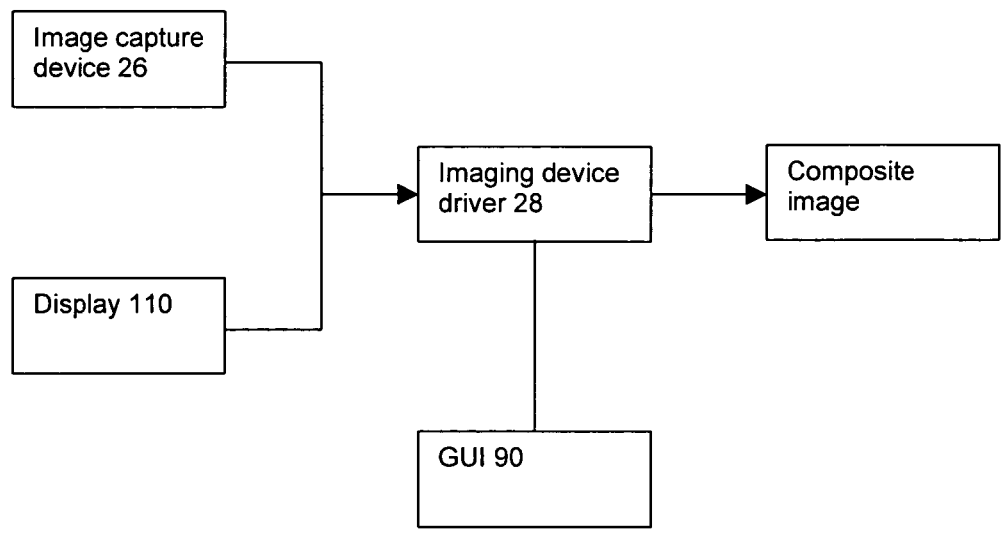
FIG. 7 shows a schematic flow diagram of composite image generation by the imaging device driver 28.

FIG. 7 shows a schematic flow diagram of composite image generation by the imaging device driver 28. GUI 90 coupled to the imaging device driver 28 may be utilised to select input from display 110 and/or image capture device 26. The GUI 90 may be used for the selection of a full or partial portion(s) of the display 110. Similarly, the GUI 90 may be used to select the full or partial portion(s) of images obtained by the image capture device 26. The imaging device driver 28 may stitch or combine the inputs from display 110 and image capture device 26 into a composite image (like FIG. 4B or 5B) for subsequent transmission to the receiver during instant messaging. If the IM application program 32 allows for the incorporation of plug-ins, the facility of image composition may be performed by the IM application program 32 and not the device driver 28.

Figure 6:
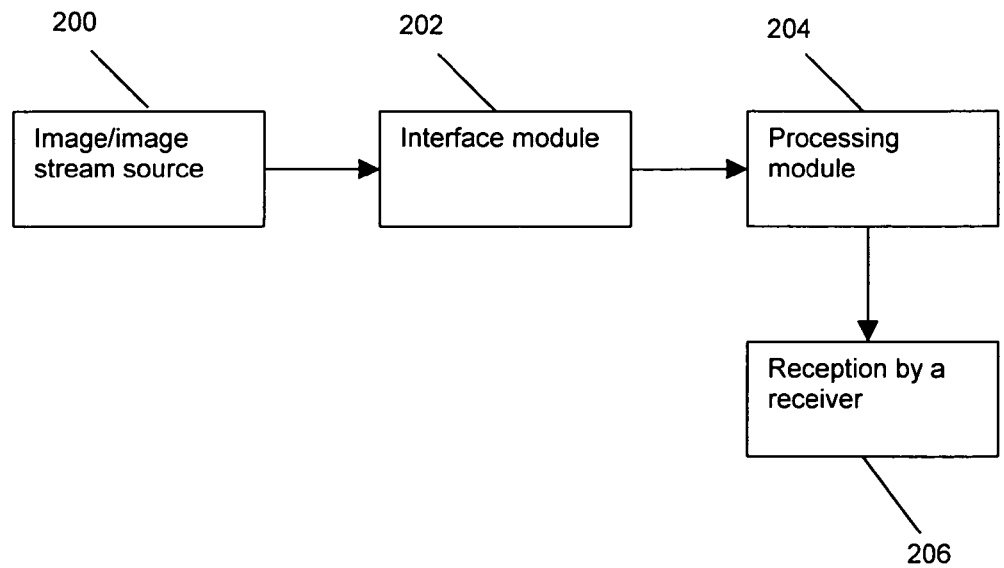
FIG. 6 shows a schematic flow diagram of a system of a preferred embodiment of the present invention.

In another aspect of the present invention as shown in FIG. 6, there is provided an image processing system to process a video instant message. In a preferred embodiment of the present invention, the system includes an image source 200 to obtain at least one image. The at least one image may be a still image or a stream of images. The image source may be an image capture device like a web camera, scanner or any other visual capture device. The image source may be a partial or full screen capture of contents in a display. There may be an interface module 202 to receive at least one image from the image source 200. The interface module 202 may act as a conduit and translator between a processing module 204 and the image source 200. The interface module 202 may be provided in an imaging device driver. The interface module 202 may also include optical character recognition (OCR) functionality to obtain images directly from a scanner.

The processing module 204 may include an IM application program such as, for example, Yahoo Instant Messenger, MSN Instant Messenger, Skype messenger, AOL Instant Messenger, and the like.

If only one image is selected for transmission to the receiver, then a single image (or stream of images) is transmitted to the receiver akin to any webcam in the current state of the art. However, if more than one image is selected by the user, a composite image for the more than one image is generated by the processing module 204. The composite image may be arranged by the user or automatically by the processing module 204. The layout of the composite image may be a default arrangement set by a manufacturer of the interface module 202, or determined by the user. The user may be either the sender or the receiver. The composite image may be akin to those as shown in FIGS. 4B and 5B as per the description in the earlier portions of this section. The processing module 204 may generate a GUI to allow selection of the at least one image making up the composite image. The GUI may also be online.

After the composite image is formed by the processing module 204, the composite image is then transmitted to a receiver 206 as an instant message. Communication to the receiver 206 may be via a network.

Whilst there has been described in the foregoing description preferred embodiments of the present invention, it will be understood by those skilled in the technology concerned that many variations or modifications in details of design or construction may be made without departing from the present invention.

The invention claimed is:

1. A method for processing a video instant message, the method including:
   receiving at least one image;
   selecting portions of the received image;
   generating a composite image based on the selected portions of the received image; and
   communicating the composite image to a receiver as the instant message,
   wherein the at least one image from the sender is obtained from the group consisting of: a screen capture of a display at the sender, and an image capture device at the sender.

2. The method of claim 1, wherein the image capture device captures both still images and a stream of images.

3. The method of claim 1, further including generating a graphical user interface for a video instant messaging application to allow either the sender or receiver to select the at least one image making up the composite image.

4. The method of claim 3, wherein the graphical user interface is either online or locally installed.

5. The method of claim 1, wherein the method is performed in an imaging device driver to interface the image capture device to a video instant messaging application associated with the device driver.

6. The method of claim 5, wherein the imaging device driver is configured to communicate with a video instant messaging application selected from one of: AOL Instant Messenger (AIM), MSN Instant Messenger, Skype Messenger, and Yahoo Instant Messenger.

7. The method of claim 1, wherein the screen capture is of the type selected from the group consisting of: partial and full.

8. The method of claim 1, wherein the image obtained from the image capture device is either at least one portion of the image or an entire image.

9. A non-transitory machine-readable medium embodying instructions that, when executed by a machine, cause the machine to perform the method of claim 1.

10. An image processing system to process a video instant message, the system including:
    an interface module to receive at least one image from an image source, the interface module being configurable to select portions of the received image; and
    a processing module to generate a composite image based on the selected portions of the received image, the composite image being for communication to a receiver as the video instant message,
    wherein the at least one image is obtained using the interface module from the group consisting of: a screen capture of a display, and an image capture device.

11. The system of claim 10, wherein the image capture device captures both still images and a stream of images.

12. The system of claim 10, wherein the processing module generates a graphical user interface to allow selection of the at least one image making up the composite image.

13. The system of claim 12, wherein the graphical user interface is either online or locally installed.

14. The system of claim 10, wherein the interface module is provided to interface an image source to the processing module.

15. The system of claim 10, wherein the processing module includes a video instant messaging application selected from one of: AOL Instant Messenger (AIM), MSN Instant Messenger, Skype Messenger, and Yahoo Instant Messenger.

16. The system of claim 10, wherein the screen capture is of the type selected from the group consisting of: partial and full.

17. The system of claim 10, wherein the image obtained from the image source is either at least one portion of the image or an entire image.

* * * * *